US012325168B2

(12) United States Patent
Blair et al.

(10) Patent No.: US 12,325,168 B2
(45) Date of Patent: Jun. 10, 2025

(54) SYSTEM AND METHOD OF MAKING A MESH CUSHION

(71) Applicant: Lear Corporation, Southfield, MI (US)

(72) Inventors: Sam Blair, Southfield, MI (US); Joshua Hallock, Southfield, MI (US); David Abdella, Southfield, MI (US); Pat Carlsen, Southfield, MI (US); Michelle A. Pereny, Southfield, MI (US)

(73) Assignee: Lear Corporation, Southfield, MI (US)

( * ) Notice: Subject to any disclaimer, the term of this patent is extended or adjusted under 35 U.S.C. 154(b) by 261 days.

(21) Appl. No.: 17/555,875

(22) Filed: Dec. 20, 2021

(65) Prior Publication Data

US 2023/0191680 A1    Jun. 22, 2023

(51) Int. Cl.
| | |
|---|---|
| *B29C 48/05* | (2019.01) |
| *B29C 43/22* | (2006.01) |
| *B29C 43/34* | (2006.01) |
| *B29C 43/46* | (2006.01) |
| *B29C 48/88* | (2019.01) |
| *B29L 31/58* | (2006.01) |
| *D04H 1/736* | (2012.01) |

(52) U.S. Cl.
CPC ............. *B29C 48/05* (2019.02); *B29C 43/22* (2013.01); *B29C 43/34* (2013.01); *B29C 43/46* (2013.01); *B29C 48/911* (2019.02); *D04H 1/736* (2013.01); *B29C 2043/3433* (2013.01); *B29L 2031/58* (2013.01)

(58) Field of Classification Search
CPC ............................................. B29C 2043/3433
See application file for complete search history.

(56) References Cited

U.S. PATENT DOCUMENTS

| | | | |
|---|---|---|---|
| 1,621,008 | A | 3/1927 | Anthony |
| 2,130,935 | A | 9/1938 | Thompson |
| 2,188,995 | A | 2/1940 | Avery et al. |
| 2,630,938 | A | 3/1953 | Howard, V |
| 2,630,968 | A | 3/1953 | Morris |
| 3,155,363 | A | 11/1964 | Lohr |
| 3,309,052 | A | 3/1967 | Bernard |
| 3,315,283 | A | 4/1967 | Larsen |
| 3,630,572 | A | 12/1971 | Homier |
| 3,689,620 | A | 9/1972 | Miyazaki et al. |
| 3,733,658 | A | 5/1973 | Mitchell |

(Continued)

FOREIGN PATENT DOCUMENTS

| | | |
|---|---|---|
| AU | 2006227668 A1 | 9/2006 |
| AU | 2003296088 B2 | 9/2008 |

(Continued)

OTHER PUBLICATIONS

Invitation to Pay Additional Fees for Application No. PCT/US22/53366, dated Mar. 9, 2023, 2 pages.

(Continued)

*Primary Examiner* — Virak Nguon
(74) *Attorney, Agent, or Firm* — Brooks Kushman P.C.

(57) ABSTRACT

A method of making a mesh cushion. The method includes extruding a material through a plurality of filament forming openings in at least one die plate to form a plurality of filaments. The filaments may be at least partially submerged into a fluid to cool and harden the filaments into the mesh cushion.

20 Claims, 6 Drawing Sheets

(56) References Cited

U.S. PATENT DOCUMENTS

| | | |
|---|---|---|
| D239,147 S | 3/1976 | Karlsen |
| 3,961,823 A | 6/1976 | Caudill, Jr. |
| 4,031,579 A | 6/1977 | Larned |
| 4,287,657 A | 9/1981 | Andre et al. |
| 4,396,823 A | 8/1983 | Nihei et al. |
| 4,476,594 A | 10/1984 | McLeod |
| 4,663,211 A | 5/1987 | Kon |
| 4,751,029 A | 6/1988 | Swanson |
| 4,859,516 A | 8/1989 | Yamanaka et al. |
| 4,860,402 A | 8/1989 | Dichtel |
| 4,876,135 A | 10/1989 | McIntosh |
| 4,881,997 A | 11/1989 | Hatch |
| 4,900,377 A | 2/1990 | Redford et al. |
| 4,913,757 A | 4/1990 | Yamanaka et al. |
| 4,933,224 A | 6/1990 | Hatch |
| 4,952,265 A | 8/1990 | Yamanaka et al. |
| 4,953,770 A | 9/1990 | Bond, Sr. |
| 5,003,664 A | 4/1991 | Wong |
| 5,007,676 A | 4/1991 | Lien |
| 5,016,941 A | 5/1991 | Yokota |
| 5,092,381 A | 3/1992 | Feijin et al. |
| 5,095,592 A | 3/1992 | Doerfling |
| 5,313,034 A | 5/1994 | Grimm et al. |
| 5,378,296 A | 1/1995 | Vesa |
| 5,381,922 A | 1/1995 | Gladman et al. |
| 5,405,178 A | 4/1995 | Weingartner et al. |
| D364,269 S | 11/1995 | Sabosky |
| 5,464,491 A | 11/1995 | Yamanaka |
| 5,482,665 A | 1/1996 | Gill |
| 5,492,662 A | 2/1996 | Kargol et al. |
| 5,494,627 A | 2/1996 | Kargol et al. |
| 5,551,755 A | 9/1996 | Lindberg |
| 5,569,641 A | 10/1996 | Smith et al. |
| 5,586,807 A | 12/1996 | Taggart |
| 5,587,121 A | 12/1996 | Vesa |
| 5,620,759 A | 4/1997 | Insley et al. |
| 5,622,262 A | 4/1997 | Sadow |
| 5,639,543 A | 6/1997 | Isoda et al. |
| 5,669,129 A | 9/1997 | Smith et al. |
| 5,669,799 A | 9/1997 | Moseneder et al. |
| 5,733,825 A | 3/1998 | Martin et al. |
| 5,788,332 A | 8/1998 | Hettinga |
| 5,811,186 A | 9/1998 | Martin et al. |
| 5,819,408 A | 10/1998 | Catlin |
| 5,833,321 A | 11/1998 | Kim et al. |
| 5,966,783 A | 10/1999 | Genereux et al. |
| 6,057,024 A | 5/2000 | Mleziva et al. |
| 6,063,317 A | 5/2000 | Carroll, III |
| 6,131,220 A | 10/2000 | Morimura |
| 6,272,707 B1 | 8/2001 | Robrecht et al. |
| 6,283,552 B1 | 9/2001 | Halse et al. |
| 6,302,487 B1 | 10/2001 | Fujita et al. |
| 6,347,790 B1 | 2/2002 | Nishibori et al. |
| 6,378,150 B1 | 4/2002 | Minegishi et al. |
| D461,746 S | 8/2002 | Olson et al. |
| 6,457,218 B1 | 10/2002 | Lawrence |
| 6,558,590 B1 | 5/2003 | Stewart |
| 6,668,429 B2 | 12/2003 | Fujisawa et al. |
| 6,766,201 B2 | 7/2004 | Von Arx et al. |
| 6,776,201 B2 | 8/2004 | Willis |
| 6,918,146 B2 | 7/2005 | England |
| D523,330 S | 6/2006 | Mattesky |
| 7,073,230 B2 | 7/2006 | Boville |
| 7,100,978 B2 | 9/2006 | Ekern et al. |
| D530,192 S | 10/2006 | Becerra |
| 7,128,371 B2 | 10/2006 | Kawasaki et al. |
| 7,141,768 B2 | 11/2006 | Malofsky et al. |
| 7,158,968 B2 | 1/2007 | Cardno |
| D538,704 S | 3/2007 | Kaminski |
| 7,290,300 B1 | 11/2007 | Khambete |
| 7,377,762 B2 | 5/2008 | Nishibori et al. |
| 7,427,103 B2 | 9/2008 | Weber |
| 7,481,489 B2 | 1/2009 | Demick |
| 7,506,939 B2 | 3/2009 | Borckschneider et al. |
| 7,547,061 B2 | 6/2009 | Horimatsu et al. |
| 7,549,707 B2 | 6/2009 | Brennan et al. |
| 7,622,179 B2 | 11/2009 | Patel |
| 7,625,629 B2 | 12/2009 | Takaoka |
| 7,669,925 B2 | 3/2010 | Beck et al. |
| 7,707,743 B2 | 5/2010 | Schindler et al. |
| 7,771,375 B2 | 8/2010 | Nishibori et al. |
| 7,837,263 B2 | 11/2010 | Booth et al. |
| 7,892,991 B2 | 2/2011 | Yamanaka et al. |
| D636,293 S | 4/2011 | Dolce et al. |
| 7,946,649 B2 | 5/2011 | Galbreath et al. |
| 7,993,734 B2 | 8/2011 | Takaoka |
| 8,052,212 B2 | 11/2011 | Backendorf |
| 8,056,263 B2 | 11/2011 | Schindler et al. |
| 8,226,882 B2 | 7/2012 | Takaoka |
| 8,240,759 B2 | 8/2012 | Hobl et al. |
| 8,276,235 B2 | 10/2012 | Naughton |
| 8,277,210 B2 | 10/2012 | Takaoka |
| D677,193 S | 3/2013 | MacDonald |
| 8,563,121 B2 | 10/2013 | Takaoka |
| 8,563,123 B2 | 10/2013 | Takaoka |
| 8,568,635 B2 | 10/2013 | Takaoka |
| 8,721,825 B2 | 5/2014 | Takaoka |
| 8,752,902 B2 | 6/2014 | Labish |
| 8,757,996 B2 | 6/2014 | Takaoka |
| 8,828,293 B2 | 9/2014 | Takaoka |
| 8,882,202 B2 | 11/2014 | Petzel et al. |
| 8,932,692 B2 | 1/2015 | Pearce |
| 9,004,591 B2 | 4/2015 | Murasaki et al. |
| 9,097,921 B2 | 8/2015 | Ogasawara et al. |
| 9,168,854 B2 | 10/2015 | Ursino et al. |
| 9,169,585 B2 | 10/2015 | Takaoka |
| 9,174,404 B2 | 11/2015 | Takaoka |
| 9,179,748 B2 | 11/2015 | Esti |
| 9,194,066 B2 | 11/2015 | Takaoka |
| 9,283,875 B1 | 3/2016 | Pellettiere |
| 9,334,593 B2 | 5/2016 | Sasaki |
| 9,434,286 B2 | 9/2016 | Klusmeier et al. |
| 9,440,390 B2 | 9/2016 | Takaoka |
| 9,447,522 B2 | 9/2016 | Zikeli et al. |
| 9,456,702 B2 | 10/2016 | Miyata et al. |
| 9,528,209 B2 | 12/2016 | Takaoka |
| 9,561,612 B2 | 2/2017 | Takaoka |
| 9,598,803 B2 | 3/2017 | Takaoka |
| 9,615,670 B2 | 4/2017 | Takaoka |
| 9,616,790 B2 | 4/2017 | Stankiewicz et al. |
| 9,617,021 B2 | 4/2017 | McCorkle et al. |
| 9,669,744 B2 | 6/2017 | Cao et al. |
| 9,688,007 B2 | 6/2017 | Cheng |
| 9,708,067 B2 | 7/2017 | Wilson et al. |
| 9,751,442 B2 | 9/2017 | Smith |
| 9,771,174 B2 | 9/2017 | Murray |
| D798,875 S | 10/2017 | Huang |
| 9,789,796 B1 | 10/2017 | White |
| 9,918,559 B2 | 3/2018 | Osaki |
| 9,918,560 B2 | 3/2018 | Osaki |
| 9,925,899 B2 | 3/2018 | Mogi et al. |
| 9,938,649 B2 | 4/2018 | Taninaka et al. |
| 9,970,140 B2 | 5/2018 | Taninaka et al. |
| 10,118,323 B2 | 11/2018 | Fujita et al. |
| 10,150,320 B2 | 12/2018 | Ellringmann et al. |
| 10,231,511 B2 | 3/2019 | Guyan et al. |
| 10,233,073 B2 | 3/2019 | Takaoka |
| 10,266,977 B2 | 4/2019 | Takaoka |
| 10,316,444 B2 | 6/2019 | Wakui et al. |
| 10,328,618 B2 | 6/2019 | Takaoka |
| 10,343,565 B2 | 7/2019 | Baek et al. |
| 10,398,236 B2 | 9/2019 | Achten et al. |
| 10,399,848 B2 | 9/2019 | Kristo et al. |
| 10,414,305 B2 | 9/2019 | Ishii et al. |
| 10,421,414 B2 | 9/2019 | Townley et al. |
| 10,501,598 B2 | 12/2019 | Baldwin et al. |
| 10,604,040 B2 | 3/2020 | Clauser et al. |
| 10,618,799 B2 | 4/2020 | Shah et al. |
| 10,730,419 B2 | 8/2020 | Low et al. |
| 10,736,435 B2 | 8/2020 | Duncan et al. |
| 10,744,914 B2 | 8/2020 | Baek et al. |
| 10,750,820 B2 | 8/2020 | Guyan |
| RE48,225 E | 9/2020 | Kheil et al. |
| 10,780,805 B2 | 9/2020 | Kamata |

(56) References Cited

U.S. PATENT DOCUMENTS

| | | |
|---|---|---|
| 10,806,272 B2 | 10/2020 | Ando et al. |
| 10,821,862 B2 | 11/2020 | Russman et al. |
| 10,843,600 B2 | 11/2020 | Booth et al. |
| 10,882,444 B2 | 1/2021 | Townley et al. |
| 10,889,071 B2 | 1/2021 | Kojima et al. |
| D909,792 S | 2/2021 | Pound |
| 10,934,644 B2 | 3/2021 | Taninaka et al. |
| 11,007,761 B2 | 5/2021 | Ben-Daat et al. |
| 11,168,421 B2 | 11/2021 | Wakui et al. |
| 11,186,336 B2 | 11/2021 | Primeaux et al. |
| D948,764 S | 4/2022 | Peterson |
| 11,369,532 B2 | 6/2022 | Wilson et al. |
| 11,383,625 B2 | 7/2022 | Voigt et al. |
| 11,554,699 B2 | 1/2023 | Liau et al. |
| D1,005,380 S | 11/2023 | McWilliams et al. |
| 2002/0101109 A1 | 8/2002 | Stiller et al. |
| 2002/0193221 A1 | 12/2002 | Tisi |
| 2003/0026970 A1 | 2/2003 | Hernandez et al. |
| 2003/0032731 A1 | 2/2003 | Oswald et al. |
| 2003/0061663 A1 | 4/2003 | Lampel |
| 2003/0092335 A1 | 5/2003 | Takaoka |
| 2004/0036326 A1 | 2/2004 | Bajic et al. |
| 2004/0063450 A1 | 4/2004 | Uhlik |
| 2004/0099981 A1 | 5/2004 | Gerking |
| 2004/0126577 A1* | 7/2004 | Lee ................... B60C 9/0042 428/364 |
| 2004/0142619 A1 | 7/2004 | Ueno et al. |
| 2004/0255385 A1 | 12/2004 | England |
| 2005/0030011 A1 | 2/2005 | Shimizu et al. |
| 2005/0066423 A1 | 3/2005 | Hogan |
| 2005/0198874 A1 | 9/2005 | Wurm |
| 2005/0238842 A1 | 10/2005 | Schindzielorz et al. |
| 2006/0068120 A1 | 3/2006 | Sreenivasan et al. |
| 2006/0116045 A1 | 6/2006 | Nishibori et al. |
| 2006/0198983 A1 | 9/2006 | Patel |
| 2006/0200119 A1 | 9/2006 | Vaska et al. |
| 2006/0200120 A1 | 9/2006 | Dicarlo et al. |
| 2006/0237986 A1 | 10/2006 | Brockschneider et al. |
| 2007/0001336 A1 | 1/2007 | Nishibori et al. |
| 2007/0057414 A1 | 3/2007 | Hartge |
| 2007/0066197 A1 | 3/2007 | Woo et al. |
| 2007/0134464 A1 | 6/2007 | Brockschneider et al. |
| 2007/0207691 A1 | 9/2007 | Cobbett Wiles et al. |
| 2008/0099458 A1 | 5/2008 | Hilmer |
| 2008/0102149 A1 | 5/2008 | Williams |
| 2008/0203615 A1 | 8/2008 | Brum |
| 2008/0252111 A1 | 10/2008 | Rothkop et al. |
| 2008/0254281 A1 | 10/2008 | Chen et al. |
| 2008/0309143 A1 | 12/2008 | Booth et al. |
| 2009/0008377 A1 | 1/2009 | Nathan et al. |
| 2009/0108494 A1 | 4/2009 | Ito et al. |
| 2009/0152909 A1 | 6/2009 | Andersson |
| 2009/0269570 A1 | 10/2009 | Takaoka |
| 2009/0269571 A1 | 10/2009 | Takaoka |
| 2010/0181796 A1 | 7/2010 | Galbreath et al. |
| 2010/0258334 A1 | 10/2010 | Akaike et al. |
| 2011/0252568 A1 | 10/2011 | Ramp |
| 2011/0278902 A1 | 11/2011 | Galbreath et al. |
| 2011/0316185 A1 | 12/2011 | Takaoka |
| 2012/0042452 A1 | 2/2012 | Takaoka |
| 2012/0104646 A1 | 5/2012 | Takaoka |
| 2012/0112515 A1 | 5/2012 | Labish |
| 2012/0180939 A1 | 7/2012 | Takaoka |
| 2012/0181841 A1 | 7/2012 | Petzel et al. |
| 2012/0301701 A1 | 11/2012 | Takaoka |
| 2012/0319323 A1 | 12/2012 | Takaoka |
| 2012/0328722 A1 | 12/2012 | Takaoka |
| 2013/0000043 A1 | 1/2013 | Bullard et al. |
| 2013/0020016 A1 | 1/2013 | Takaoka |
| 2013/0137330 A1 | 5/2013 | Grimm |
| 2013/0161858 A1 | 6/2013 | Sasaki |
| 2013/0164123 A1 | 6/2013 | Helmenstein |
| 2013/0189472 A1 | 7/2013 | Takaoka |
| 2013/0200661 A1 | 8/2013 | Klusmeier et al. |
| 2014/0029900 A1 | 1/2014 | Logan, Jr. et al. |
| 2014/0035191 A1 | 2/2014 | Takaoka |
| 2014/0037907 A1 | 2/2014 | Takaoka |
| 2014/0037908 A1 | 2/2014 | Takaoka |
| 2014/0042792 A1 | 2/2014 | Kajiwara |
| 2014/0062161 A1 | 3/2014 | Elenbaas et al. |
| 2014/0138016 A1 | 5/2014 | Takaoka |
| 2014/0167328 A1 | 6/2014 | Petzel |
| 2014/0354029 A1 | 12/2014 | Takaoka |
| 2014/0370769 A1 | 12/2014 | Osaki |
| 2014/0378015 A1 | 12/2014 | Osaki |
| 2015/0072107 A1 | 3/2015 | Fujita et al. |
| 2015/0091209 A1 | 4/2015 | Mueller et al. |
| 2015/0197056 A1 | 7/2015 | Takaoka |
| 2015/0210192 A1 | 7/2015 | Benson et al. |
| 2015/0219136 A1 | 8/2015 | Koelling |
| 2015/0266263 A1 | 9/2015 | Ichikawa |
| 2015/0272332 A1 | 10/2015 | Noguchi et al. |
| 2015/0274048 A1 | 10/2015 | Mogi et al. |
| 2015/0284894 A1 | 10/2015 | Takaoka |
| 2015/0367583 A1 | 12/2015 | Blot et al. |
| 2016/0009209 A1 | 1/2016 | Cao et al. |
| 2016/0010250 A1 | 1/2016 | Taninaka et al. |
| 2016/0023387 A1 | 1/2016 | Takaoka |
| 2016/0032506 A1 | 2/2016 | Takaoka |
| 2016/0051009 A1 | 2/2016 | Kormann et al. |
| 2016/0052433 A1 | 2/2016 | Ono et al. |
| 2016/0052435 A1 | 2/2016 | Nakada |
| 2016/0096462 A1 | 4/2016 | Kromm et al. |
| 2016/0122925 A1 | 5/2016 | Shah et al. |
| 2016/0144756 A1 | 5/2016 | Ito et al. |
| 2016/0157628 A1 | 6/2016 | Khambete et al. |
| 2016/0174725 A1 | 6/2016 | Takaoka |
| 2016/0263802 A1 | 9/2016 | Takaoka |
| 2016/0318428 A1 | 11/2016 | Hugues |
| 2016/0374428 A1 | 12/2016 | Kormann et al. |
| 2017/0043695 A1 | 2/2017 | Kitamoto et al. |
| 2017/0174346 A1 | 6/2017 | Wilson et al. |
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 | 2/2018 | Dry |
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori |
| 2019/0232835 A1 | 8/2019 | Murakami |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller et al. |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0231428 A1 | 7/2020 | Migneco et al. |
| 2020/0262323 A1 | 8/2020 | Robinson et al. |
| 2020/0332445 A1 | 10/2020 | Taninaka et al. |
| 2020/0360210 A1 | 11/2020 | Zoni, III et al. |
| 2021/0024155 A1 | 1/2021 | Primeaux et al. |
| 2021/0046731 A1 | 2/2021 | Nishikawa et al. |
| 2021/0054549 A1 | 2/2021 | Takaoka |
| 2021/0074258 A1 | 3/2021 | Konno et al. |
| 2021/0086670 A1 | 3/2021 | Kozlowski et al. |
| 2021/0115607 A1 | 4/2021 | Inoue et al. |
| 2021/0188138 A1 | 6/2021 | Powell et al. |
| 2021/0221266 A1 | 7/2021 | Kozlowski et al. |
| 2021/0291421 A1 | 9/2021 | Nattrass et al. |
| 2021/0299995 A1 | 9/2021 | Sieradzki et al. |
| 2022/0017003 A1 | 1/2022 | Carraro et al. |
| 2022/0017718 A1 | 1/2022 | Martin et al. |
| 2022/0025561 A1 | 1/2022 | Yasui et al. |

(56) References Cited

U.S. PATENT DOCUMENTS

| | | |
|---|---|---|
| 2022/0169554 A1 | 6/2022 | Du Moulinet D'Hardemare et al. |
| 2022/0178057 A1 | 6/2022 | Maschino et al. |
| 2022/0314851 A1 | 10/2022 | Pereny et al. |
| 2022/0314854 A1 | 10/2022 | Pereny et al. |
| 2022/0370749 A1 | 11/2022 | Dunn et al. |
| 2022/0402416 A1 | 12/2022 | Yang et al. |
| 2022/0410775 A1 | 12/2022 | Aoki et al. |
| 2023/0028451 A1 | 1/2023 | Gastaldi |
| 2023/0173964 A1 | 6/2023 | Webster et al. |
| 2023/0191678 A1 | 6/2023 | Blair et al. |
| 2023/0191680 A1 | 6/2023 | Blair et al. |
| 2023/0322136 A1 | 10/2023 | Mansouri et al. |

FOREIGN PATENT DOCUMENTS

| | | |
|---|---|---|
| BR | 112014004632 B1 | 4/2021 |
| BR | 112014001603 A2 | 8/2021 |
| BR | 112013020474 B1 | 9/2021 |
| BR | 112017016357 B1 | 3/2022 |
| CA | 3102262 A1 | 12/2019 |
| CN | 100467696 C | 3/2009 |
| CN | 1859862 B | 4/2010 |
| CN | 202509164 U | 10/2012 |
| CN | 104582538 B | 4/2015 |
| CN | 105026632 A | 11/2015 |
| CN | 102959151 B | 4/2016 |
| CN | 105612279 A | 5/2016 |
| CN | 103328711 B | 6/2016 |
| CN | 104024511 B | 8/2016 |
| CN | 106231959 B | 12/2016 |
| CN | 104080959 B | 2/2017 |
| CN | 106387295 A | 2/2017 |
| CN | 103998668 B | 3/2017 |
| CN | 103827376 B | 6/2017 |
| CN | 105683434 B | 7/2017 |
| CN | 104285003 B | 9/2017 |
| CN | 105705695 B | 1/2018 |
| CN | 207140883 U | 3/2018 |
| CN | 208484779 U | 2/2019 |
| CN | 109680413 A | 4/2019 |
| CN | 107614238 B | 2/2020 |
| CN | 107208339 B | 6/2020 |
| CN | 107532357 B | 8/2020 |
| CN | 111989430 A | 11/2020 |
| CN | 112020578 A | 12/2020 |
| CN | 107708493 B | 1/2021 |
| CN | 107208340 B | 2/2021 |
| CN | 109552123 B | 7/2021 |
| CN | 113166995 A | 7/2021 |
| CN | 213618701 U | 7/2021 |
| CN | 215203369 U | 12/2021 |
| CN | 113930900 A | 1/2022 |
| CN | 109680412 B | 2/2022 |
| CN | 115139881 A | 10/2022 |
| CN | 113930900 B | 1/2023 |
| DE | 2626748 C3 | 10/1979 |
| DE | 3127303 A1 | 1/1983 |
| DE | 3037834 C2 | 5/1987 |
| DE | 3690196 C1 | 10/1989 |
| DE | 102004053133 A1 | 5/2006 |
| DE | 202006017670 U1 | 7/2007 |
| DE | 102006020306 A1 | 11/2007 |
| DE | 102008033468 A | 2/2009 |
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102022107559 A | 10/2022 |
| DK | 1832675 T3 | 6/2013 |
| DK | 2772576 T3 | 5/2015 |
| DK | 3255192 T3 | 3/2020 |
| DK | 202370025 A1 | 2/2024 |
| DK | 202370426 A1 | 8/2024 |
| EP | 0145603 B1 | 4/1988 |
| EP | 0370991 A2 | 5/1990 |
| EP | 0392568 A1 | 10/1990 |
| EP | 0240388 A2 | 1/1991 |
| EP | 0805064 A2 | 11/1997 |
| EP | 0890430 A2 | 1/1999 |
| EP | 0926302 A2 | 6/1999 |
| EP | 0894885 B1 | 11/2002 |
| EP | 1586687 A1 | 10/2005 |
| EP | 1270787 B1 | 6/2010 |
| EP | 1858944 B1 | 7/2011 |
| EP | 2532502 A1 | 12/2012 |
| EP | 2565304 A1 | 3/2013 |
| EP | 1832675 B1 | 4/2013 |
| EP | 1683446 B1 | 7/2013 |
| EP | 2774807 A2 | 9/2014 |
| EP | 2489770 B1 | 1/2015 |
| EP | 2772576 B1 | 4/2015 |
| EP | 2230132 B1 | 5/2016 |
| EP | 2653598 B1 | 7/2016 |
| EP | 3210487 A1 | 8/2017 |
| EP | 2792776 B1 | 10/2017 |
| EP | 2792775 B1 | 11/2017 |
| EP | 2848721 B1 | 1/2018 |
| EP | 3305500 A1 | 4/2018 |
| EP | 2751312 B1 | 7/2018 |
| EP | 3064627 B1 | 8/2018 |
| EP | 3064628 B1 | 8/2018 |
| EP | 2894246 B1 | 10/2018 |
| EP | 2966206 B1 | 11/2018 |
| EP | 3256632 B1 | 3/2019 |
| EP | 3255192 B1 | 1/2020 |
| EP | 3779017 A1 | 2/2021 |
| EP | 3826820 A1 | 6/2021 |
| EP | 3889332 A1 | 10/2021 |
| EP | 3610760 B1 | 11/2021 |
| EP | 3974572 A1 | 3/2022 |
| ES | 2335962 A1 | 4/2010 |
| ES | 2335962 B1 | 4/2010 |
| ES | 2346180 T3 | 10/2010 |
| FR | 2432108 A1 | 2/1980 |
| FR | 2596626 A1 | 10/1987 |
| FR | 2675440 B1 | 12/1993 |
| FR | 2850260 A1 | 7/2004 |
| FR | 3050409 B1 | 10/2017 |
| FR | 3063461 B1 | 3/2019 |
| FR | 3109753 B1 | 11/2021 |
| GB | 072186 A * | 1/1955 |
| GB | 721866 | 1/1955 |
| GB | 721866 A | 1/1955 |
| GB | 1009799 A | 11/1965 |
| GB | 2275695 A | 9/1994 |
| GB | 2576141 A | 2/2020 |
| GB | 2577591 B | 4/2021 |
| GB | 2589497 B | 11/2021 |
| GB | 2628886 A | 10/2024 |
| IN | 201717042989 A | 3/2018 |
| IN | 336480 B | 5/2020 |
| IN | 202047045846 A | 10/2020 |
| IN | 351780 B | 11/2020 |
| IN | 382056 B | 11/2021 |
| IN | 202117027707 A | 11/2021 |
| JP | S556515 A | 1/1980 |
| JP | S5517527 A | 2/1980 |
| JP | H04286627 A | 10/1992 |
| JP | H0861414 A | 3/1996 |
| JP | H1046185 A | 2/1998 |
| JP | H115282 A | 1/1999 |
| JP | H11350326 A | 12/1999 |
| JP | 2000004993 A | 1/2000 |
| JP | 2001046185 A | 2/2001 |
| JP | 2001055719 A | 2/2001 |
| JP | 2001061612 A | 3/2001 |
| JP | 2001070106 A | 3/2001 |
| JP | 2001329631 A | 11/2001 |
| JP | 2002084894 A | 3/2002 |
| JP | 2002087879 A | 3/2002 |
| JP | 2002088636 A | 3/2002 |
| JP | 2003250667 A | 9/2003 |
| JP | 2003251089 A | 9/2003 |
| JP | 2003268668 A | 9/2003 |

(56) References Cited

FOREIGN PATENT DOCUMENTS

| | | | |
|---|---|---|---|
| JP | 2004202858 A | 7/2004 |
| JP | 3686690 B2 | 8/2005 |
| JP | 3686692 B2 | 8/2005 |
| JP | 2006200120 A | 12/2005 |
| JP | 2006006924 A | 1/2006 |
| JP | 2006200117 A | 8/2006 |
| JP | 2006200119 A | 8/2006 |
| JP | 2007098013 A | 4/2007 |
| JP | 2009090089 A | 1/2008 |
| JP | 4181878 B2 | 11/2008 |
| JP | 4350285 B2 | 10/2009 |
| JP | 4350286 B2 | 10/2009 |
| JP | 4350287 B2 | 10/2009 |
| JP | 2011177413 A | 3/2010 |
| JP | 2011045424 A | 3/2011 |
| JP | 2011152779 A | 8/2011 |
| JP | 2013091862 A | 10/2011 |
| JP | 4835150 B2 | 12/2011 |
| JP | 4907991 B2 | 4/2012 |
| JP | 2012115515 A | 6/2012 |
| JP | 5165809 B1 | 3/2013 |
| JP | 5339107 B1 | 11/2013 |
| JP | 5418741 B1 | 2/2014 |
| JP | 2014038151 A | 2/2014 |
| JP | 5454733 B1 | 3/2014 |
| JP | 5454734 B1 | 3/2014 |
| JP | 2014064767 A | 4/2014 |
| JP | 5532178 B1 | 6/2014 |
| JP | 5532179 B1 | 6/2014 |
| JP | 2014104050 A | 6/2014 |
| JP | 5569641 B1 | 8/2014 |
| JP | 2015205611 A | 11/2015 |
| JP | 5868964 B2 | 2/2016 |
| JP | 2016028900 A | 3/2016 |
| JP | 2016036972 A | 3/2016 |
| JP | 5909581 B1 | 4/2016 |
| JP | 5976511 B2 | 8/2016 |
| JP | 5986584 B2 | 9/2016 |
| JP | 5990194 B2 | 9/2016 |
| JP | 2016189879 A | 11/2016 |
| JP | 6182249 B2 | 8/2017 |
| JP | 2017150100 A | 8/2017 |
| JP | 6228278 B2 | 11/2017 |
| JP | 6294140 B2 | 3/2018 |
| JP | WO2016189879 A1 | 3/2018 |
| JP | 6311918 B2 | 4/2018 |
| JP | 6311919 B2 | 4/2018 |
| JP | 6318643 B2 | 5/2018 |
| JP | 6347492 B2 | 6/2018 |
| JP | 2020127523 A | 2/2019 |
| JP | 6527602 B2 | 6/2019 |
| JP | 6566900 B2 | 8/2019 |
| JP | 2019173217 A | 10/2019 |
| JP | 2019173218 A | 10/2019 |
| JP | 2019189972 A | 10/2019 |
| JP | 2019210565 A * | 12/2019 |
| JP | 6661666 B2 | 3/2020 |
| JP | 2020045589 A | 3/2020 |
| JP | 2020090648 A | 6/2020 |
| JP | 6725823 B2 | 7/2020 |
| JP | 2020156629 A | 10/2020 |
| JP | 6786500 B2 | 11/2020 |
| JP | 6819297 B2 | 1/2021 |
| JP | 2021045365 A | 3/2021 |
| JP | 6863537 B2 | 4/2021 |
| JP | 6909823 B2 | 7/2021 |
| JP | WO2020090648 A1 | 10/2021 |
| JP | 7002010 B2 | 2/2022 |
| JP | 7158968 B2 | 10/2022 |
| KR | 200207612 Y1 | 1/2001 |
| KR | 101141773 B1 | 5/2012 |
| KR | 101250622 B1 | 4/2013 |
| KR | 20130067823 A | 6/2013 |
| KR | 20170017488 A | 2/2017 |
| KR | 101717488 B1 | 3/2017 |
| KR | 101722929 B1 | 4/2017 |
| KR | 101722932 B1 | 4/2017 |
| KR | 20170107554 A | 9/2017 |
| KR | 20170117085 A | 10/2017 |
| KR | 101829235 B1 | 2/2018 |
| KR | 101928730 B1 | 3/2019 |
| KR | 101961514 B1 | 3/2019 |
| KR | 101983204 B1 | 5/2019 |
| KR | 102002393 B1 | 7/2019 |
| KR | 102083055 B1 | 2/2020 |
| KR | 102137446 B1 | 7/2020 |
| KR | 102148214 B1 | 8/2020 |
| KR | 102227060 B1 | 3/2021 |
| KR | 20210076130 A | 6/2021 |
| NL | 1032699 C2 | 4/2008 |
| WO | 1992018224 A1 | 10/1992 |
| WO | WO-9218224 A1 * | 10/1992 | ............ B01D 69/08 |
| WO | 1995015768 A1 | 6/1995 |
| WO | 1997002377 A1 | 1/1997 |
| WO | 2000047801 A1 | 8/2000 |
| WO | 2000071382 A1 | 11/2000 |
| WO | 01068967 A1 | 9/2001 |
| WO | 2002061217 A1 | 8/2002 |
| WO | 2004014690 A1 | 2/2004 |
| WO | 2004063450 A1 | 7/2004 |
| WO | 2005030011 A1 | 4/2005 |
| WO | 2006068120 A1 | 6/2006 |
| WO | 2009092153 A1 | 7/2009 |
| WO | 2010068854 A1 | 6/2010 |
| WO | 2010090093 A1 | 8/2010 |
| WO | 2011102951 A1 | 8/2011 |
| WO | 2012035736 A1 | 3/2012 |
| WO | 2012157289 A1 | 11/2012 |
| WO | 2013030400 A1 | 3/2013 |
| WO | 2013088736 A1 | 6/2013 |
| WO | 2013088737 A1 | 6/2013 |
| WO | 2013168699 A1 | 11/2013 |
| WO | 2014038151 A1 | 3/2014 |
| WO | 2014080614 A1 | 5/2014 |
| WO | 2014132484 A1 | 9/2014 |
| WO | 2015050134 A1 | 4/2015 |
| WO | 2015064523 A1 | 5/2015 |
| WO | 2015064557 A1 | 5/2015 |
| WO | 2015163188 A1 | 10/2015 |
| WO | 2016125766 A1 | 8/2016 |
| WO | 2016130602 A1 | 8/2016 |
| WO | 2016177425 A1 | 11/2016 |
| WO | 2016189879 A1 | 12/2016 |
| WO | 2017119157 A1 | 7/2017 |
| WO | 2017122370 A1 | 7/2017 |
| WO | 2017199474 A1 | 11/2017 |
| WO | 2018068451 A1 | 4/2018 |
| WO | 2019036559 A1 | 2/2019 |
| WO | 2019188090 A1 | 10/2019 |
| WO | 2019230304 A1 | 12/2019 |
| WO | 2020021263 A1 | 1/2020 |
| WO | 2020045589 A1 | 3/2020 |
| WO | 2020090648 A1 | 5/2020 |
| WO | 2020111110 A1 | 6/2020 |
| WO | 2020116327 A1 | 6/2020 |
| WO | 2020245670 A1 | 12/2020 |
| WO | 2021074601 A1 | 4/2021 |
| WO | 2021122937 A1 | 6/2021 |
| WO | 2021141601 A1 | 7/2021 |
| WO | 2022097435 A1 | 5/2022 |
| WO | 2023101995 A2 | 6/2023 |
| WO | 2023122018 A2 | 6/2023 |
| WO | 2023172483 A1 | 9/2023 |
| WO | 2023220261 A1 | 11/2023 |
| WO | 2023244721 A1 | 12/2023 |
| WO | 2023250026 A1 | 12/2023 |
| WO | 2024006134 A1 | 1/2024 |
| WO | 2024006143 A1 | 1/2024 |

(56) References Cited

FOREIGN PATENT DOCUMENTS

| WO | 2024097012 A1 | 5/2024 |
| WO | 2024136943 A1 | 6/2024 |

OTHER PUBLICATIONS

International Search Report and Written Opinion for Application No. PCT/US2253366, dated Jun. 15, 2023, 12 pages.

International Preliminary Report on Patentability for Application No. PCT/US2022/053366, dated Jun. 20, 2024, 8 pages.

https://www.youtube.com/watch2v=eFiPBu_fBe4, The Making of a Newton Wovenaire Crib Mattress, Apr. 21, 2016, 3 pages.

Airstring.com, About Airstring, Jan. 18, 2021, 13 pages.

http://airstring.com, Introducing Airstring The Future of Cushioning, 2016, 13 pages.

https://www.toyobo-global.com/seihin/breathair/breathair_youto.htm, Applications, Sep. 10, 2019, 5 pages.

https://www.youtube.com/watch?v=eFiPBu_fBe4, The Making of a Newton Wovenaire Crib Mattress—YouTube, 3 Pages, Apr. 21, 2016.

https://www.toyobo-global.com/seihin/breathair_youto.htm, Toyobo Breathair, Cushion Materials, 1996-2013, 3 pages.

www.newtonbaby.com pages design, Borninwater, designed to breathe, Jan. 28, 2021, 11 pages.

\* cited by examiner

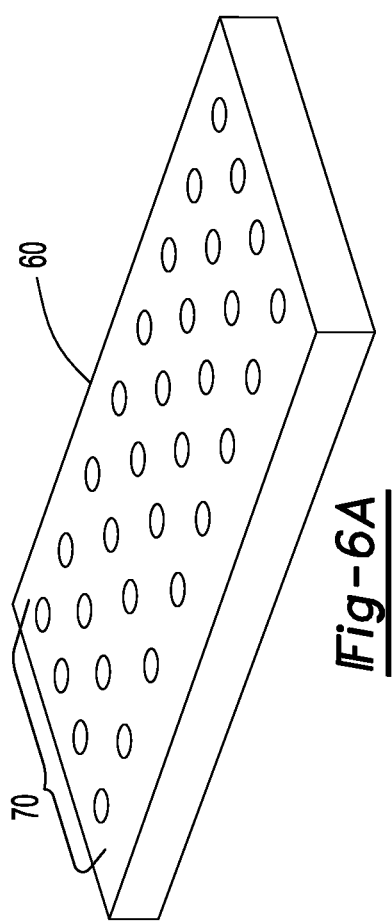
*Fig-6A*
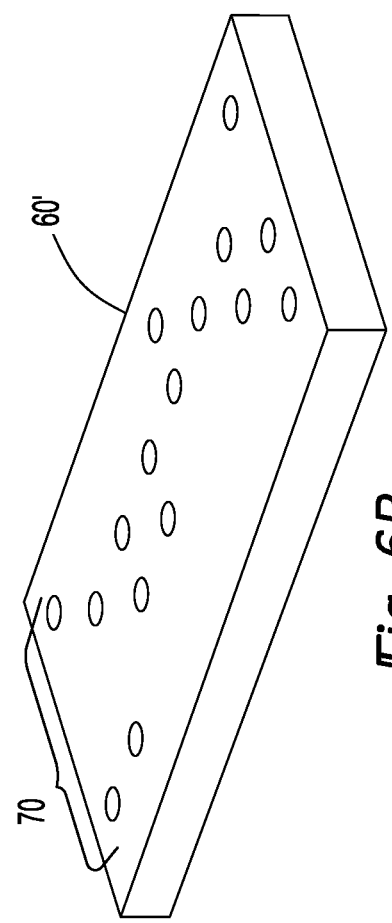
*Fig-6B*
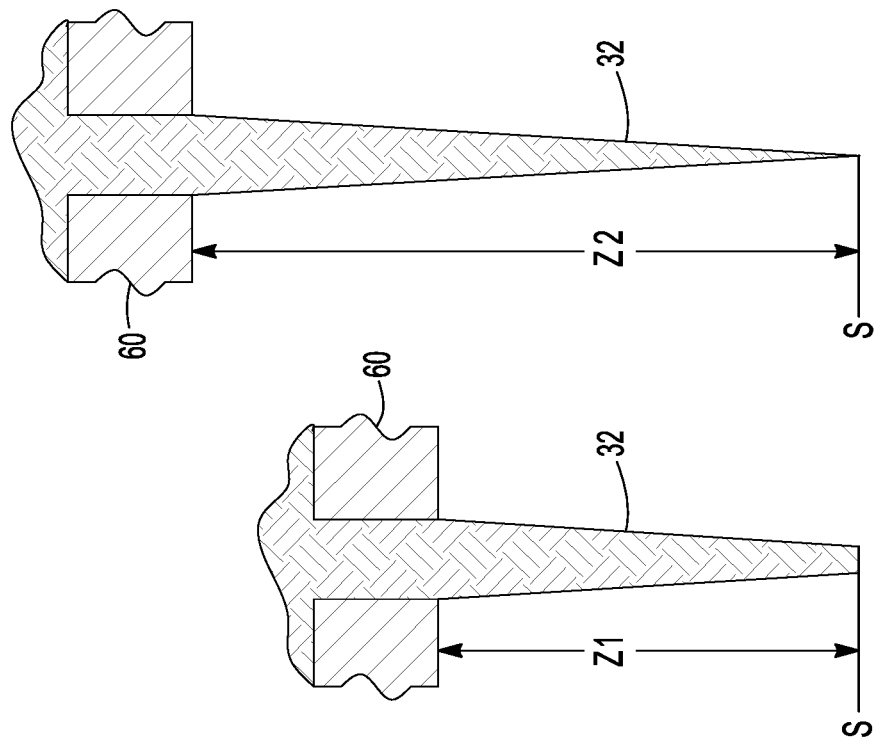
*Fig-5A*
*Fig-5B*

SYSTEM AND METHOD OF MAKING A MESH CUSHION

TECHNICAL FIELD

This relates to a system and method for making a mesh cushion, such as a mesh cushion for a seat.

BACKGROUND

A three-dimensional filaments-linked structure manufacturing apparatus is disclosed in U.S. Pat. No. 10,806,272.

SUMMARY

In at least one embodiment, a method of making a mesh cushion is provided. The method may include extruding a material through a plurality of filament forming openings in a die plate to form a plurality of filaments. The filaments may be deposited on a first roller and a second roller. The first roller may be rotatable about a first axis and may define a first recess. The second roller may be rotatable about a second axis and may define a second recess. The first roller and the second roller may be rotated to direct the filaments into the first recess and the second recess and through a gap that is located between the first roller and the second roller, thereby forming the filaments into a mesh cushion having a variable cross-sectional shape.

The first and second rollers may be spaced apart from the die plate and may be positioned below the die plate.

The filaments may be deposited while the first roller and the second roller are rotating.

The first recess and the second recess may not have mirror symmetry.

The first roller may include a first center portion and a first end plate. The first recess may extend from the first center portion. The first end plate may be rotatable about the first axis with the first center portion. The first end plate may extend further from the first axis than the first center portion. The first end plate may overlap the second roller to direct filaments into the gap between the first and second rollers.

The second roller may include a second center portion and a second end plate. The second recess may extend from the second center portion. The second end plate may be rotatable about the second axis with the second center portion. The second end plate may extend further from the second axis than the second center portion. The second end plate may overlap the first roller to direct filaments into the gap between the first and second rollers.

The first end plate of the first roller and the second end plate of the second roller may overlap each other to direct filaments into the gap.

At least a portion of the first roller and the second roller may be positioned above a funnel that defines a funnel opening through which the material may pass.

Filaments that are extruded through the die plate may be provided to a chamber that is partially defined by a housing that extends between the die plate and the funnel. The first roller and the second roller may be at least partially received in the chamber.

An environmental control subsystem may control temperature and humidity of air in the chamber to control the thickness of the filaments. The environmental control subsystem may be mounted to the housing. The environmental control subsystem may maintain the temperature of air in the chamber within a predetermined temperature range. The predetermined temperature range may be no more than 10° F. less than the melting temperature of the material.

A method of making a mesh cushion may include extruding material through a plurality of filament forming openings in a die plate to form a plurality of filaments. The filaments may be directed into a funnel to consolidate and engage the filaments. The filaments may then be deposited into a mold. The mold may be at least partially submerged into a fluid to cool and harden the filaments into a mesh cushion.

The mold may be disposed on a conveyor. The conveyor may move or lower the mold into the fluid.

The mold may be partially received in the fluid when the filaments are deposited.

The filaments that are extruded through the die plate may be provided to a chamber that includes the housing and that extends between the die plate and the funnel.

A method of making a mesh cushion may include providing a die set that includes a first die plate and a second die plate that are disposed adjacent to each other. The material may be extruded through a first set of filament forming openings in the first die plate and through a second set of filament forming openings in the second die plate to form a plurality of filaments. The relative position of the second die plate with respect to the first die plate may be changed so that the second die plate prevents the material from passing through some members of the first set of filament forming openings, thereby reducing the number of filaments that are formed by the die set. Filaments formed by the die set may be submerged into a fluid to cool and harden the filaments into the mesh cushion.

The second set of filament forming openings may have fewer members than the first set of filament forming openings.

The second die plate may be movable between a first position and a second position. The second die plate may permit the material to pass through some of the members of the first set of filament forming openings when the die plate is in the first position and in the second position.

At least one member of the second set of filament forming openings may be larger than a member of the first set of filament forming openings to permit material to flow through the member of the first set of filament forming openings when the second die plate is in the first position and in the second position.

Filaments may be directed into a funnel to consolidate and engage the filaments before submerging the filaments.

A method of making a mesh cushion may include extruding a material through a plurality of filament forming openings in a die plate to form a plurality of filaments. The die plate may be coupled to a robotic manipulator that is configured to move the die plate along a plurality of axes. The filaments may be deposited into a mold. The mold may be at least partially submerged into a fluid to cool and harden the filaments, thereby forming the filaments into the mesh cushion. The robotic manipulator may move the die plate when depositing the filaments to vary a filament density of the mesh cushion.

Material may be extruded through the plurality of filament forming openings at a substantially constant flow rate.

The robotic manipulator may move the die plate away from the mold to decrease the diameter of the filaments when the filaments reach and are deposited in the mold.

The robotic manipulator may move the die plate toward the mold to increase the diameter of the filaments when the filaments reach and are deposited in the mold.

The robotic manipulator may repeatedly move the die plate toward the mold and then away from the mold to change the filament density.

The robotic manipulator may move the die plate and a horizontal plane at a faster speed to decrease filament density and at a slower speed to increase the filament density.

BRIEF DESCRIPTION OF THE DRAWINGS

FIGS. 5A and 5B illustrate examples of differently sized filaments.

FIGS. 6A and 6B are examples of die plates that may be provided with any system associated with FIGS. 1 through 4.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings. Unless otherwise specified, expressions approximately, substantially, and in the order of mean to within 10%, preferably to within 5%.

Figure 1:
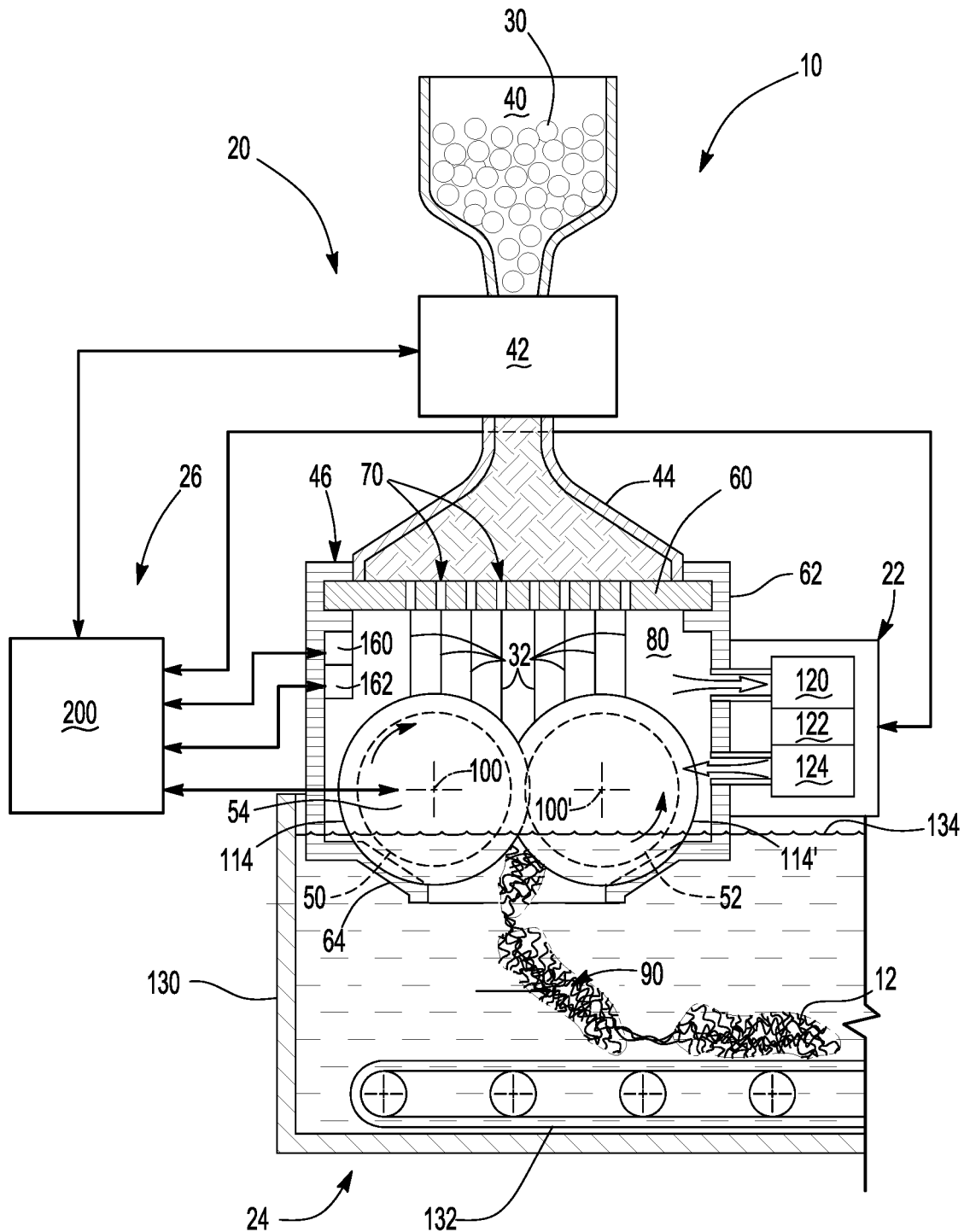
FIG. 1 is a schematic illustration of an example of a system for making a mesh cushion.

Referring to FIG. 1, an example of a system 10 for making a mesh cushion 12 is shown. The system may include an extruder subsystem 20, an environmental control subsystem 22, a material handling subsystem 24, and a control subsystem 26.

The extruder subsystem 20 may be configured to extrude a material 30 into filaments 32. In at least one configuration, the extruder subsystem 20 may include a container 40, a feeder 42, a manifold 44, and an extruder 46. The extruder subsystem 20 may also include a first roller 50, a second roller 52, and a roller drive unit 54.

The container 40 may contain and store pieces of the material 30 that is to be extruded. For instance, the container 40 may be configured as a hopper that may hold beads, granules, flakes, pellets, or powder made of the material 30. The material 30 may be a polymeric material, such as polyester or polyethylene. The container 40 may be directly mounted to or remotely positioned from the feeder 42.

The feeder 42 may receive the material 30 from the container 40. The feeder 42 may gradually melt and transport the material to the manifold 44. The feeder 42 may have any suitable configuration. For instance, the feeder 42 may include a barrel that may receive a rotatable screw. Rotation of the screw may force the material 30 to move through the barrel and may help heat the material 30 due to the friction generated as the screw rotates. Heating elements, such as thermocouples, may be disposed proximate the barrel and may provide thermal energy that may heat the barrel and the material 30. Optionally, the heating elements may be arranged to provide a heating profile having multiple zones in which the temperature of the material 30 is gradually increased as the material progresses through the barrel. Cooling equipment may also be provided to help keep the temperature below a predetermined value if too much heat is generated. The material 30 may exit the feeder 42 in a molten plastic state.

The manifold 44 may receive the molten material 30 from the feeder 42 under pressure. The manifold 44 may direct the material 30 from the feeder 42 to the extruder 46.

The extruder 46 may extrude the material 30 into filaments 32. The extruder 46 may have any suitable configuration. For instance, the extruder 46 may include one or more die plates 60, a housing 62, and a funnel 64.

One or more die plates 60 may be provided that may include a plurality of filament forming openings 70. The filament forming openings 70 may be small through holes that may be spaced apart from each other and may be sized to create back pressure in the manifold 44 and the barrel. Material 30 provided by the manifold 44 may pass through a filament forming opening 70 under pressure (i.e., be extruded from the die plate 60), thereby forming a filament 32. A filament may be formed by each filament forming opening 70 through which the material 30 passes under pressure.

Figure 3:
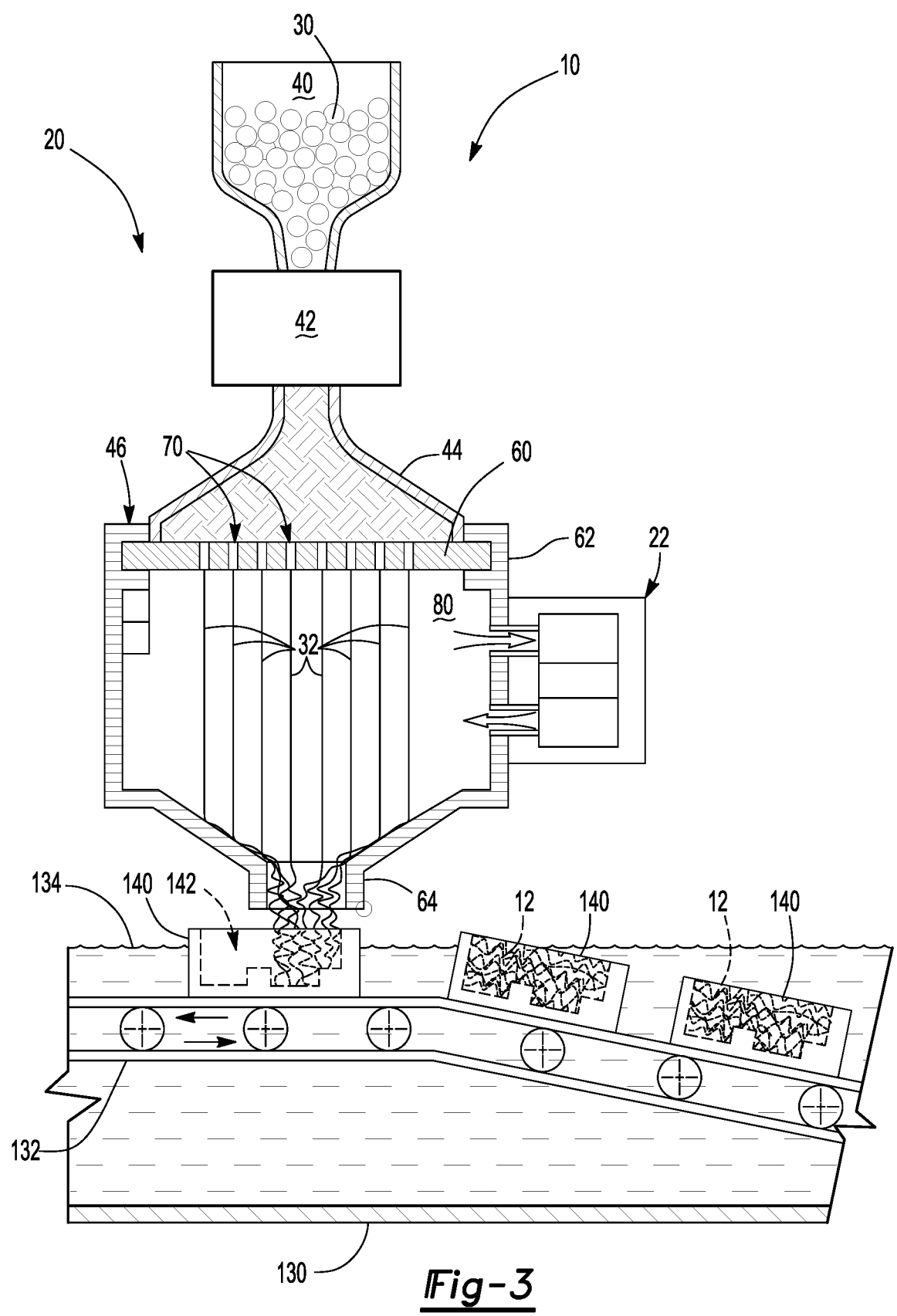
FIG. 3 is a schematic illustration of a second example of a system for making a mesh cushion.
Figure 4:
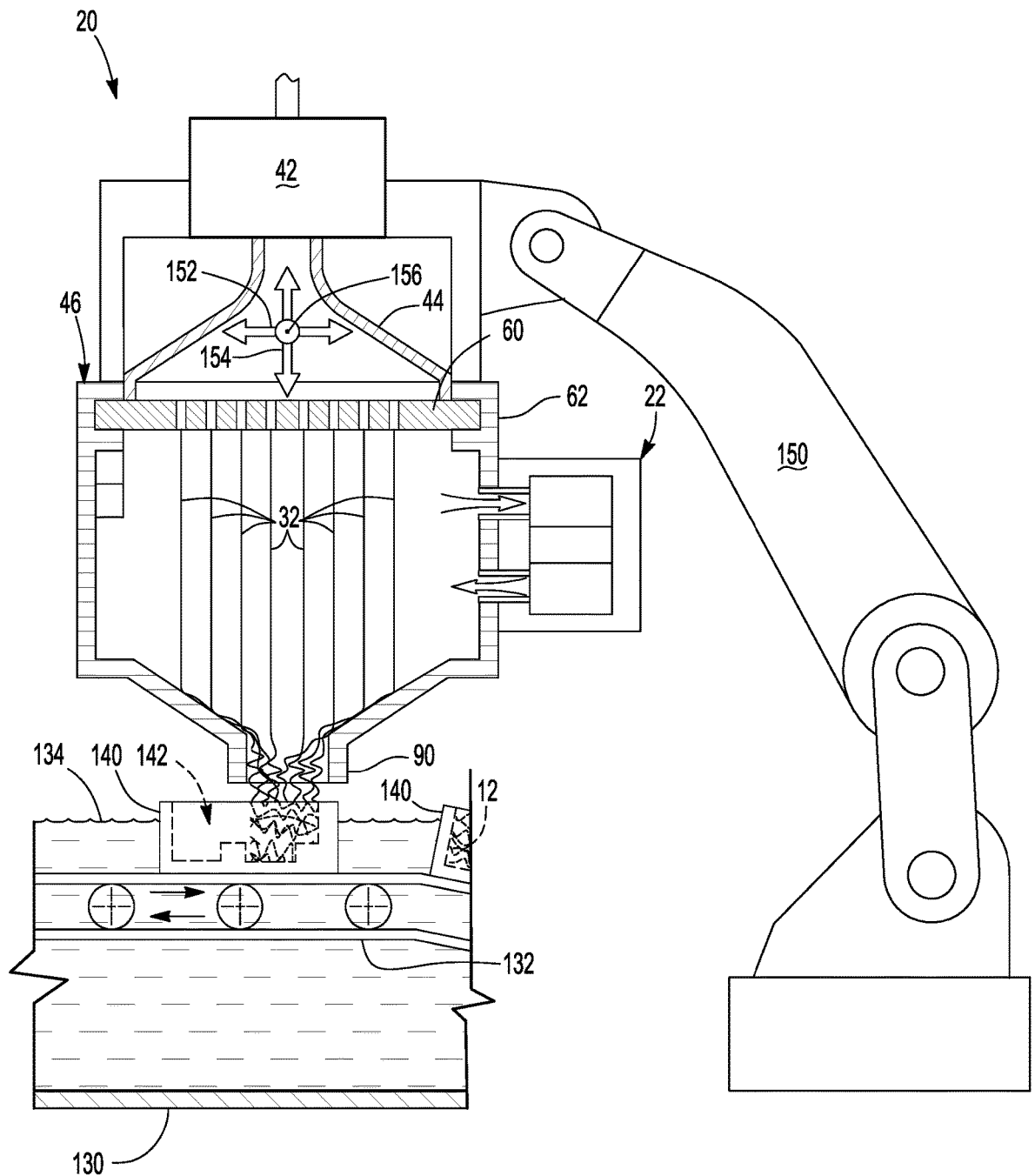
FIG. 4 is a schematic illustration of a third example of a system for making a mesh cushion.

The housing 62 may receive and support the die plate 60. In addition, the housing 62 may extend between the die plate 60 and the funnel 64. The housing 62 may cooperate with the die plate 60 and the funnel 64 to completely define or partially define a chamber 80. The chamber 80 may be disposed below the die plate 60 and above the funnel 64. As such, filaments 32 formed by or extruded through the die plate 60 may be provided to the chamber 80. The chamber 80 may be an enclosed area that is at least partially separated or isolated from the surrounding environment. In FIGS. 1, 3, and 4, a side of the housing 62 closest to the viewer from the perspective shown has been omitted to better show features inside the housing 62. The environmental control subsystem 22 may help control the environment in the chamber 80 as will be discussed in more detail below.

The funnel 64, if provided, may be disposed proximate the bottom of the housing 62. The funnel 64 may define a funnel opening 90 through which material 30 or a mesh cushion 12 made from the material 30 may pass. The funnel opening 90 may have a smaller width or extend along a shorter distance than the filament forming openings 70 extend along the die plate 60. As such, the funnel opening 90 may help consolidate or condense the filaments 32 in one or more configurations. In at least one configuration, the funnel 64 may extend into a fluid that is provided with the material handling subsystem 24, which may help isolate the chamber 80 from ambient air and the surrounding environment. It is also contemplated that the funnel 64 may be omitted in one or more configurations. It is also contemplated that the housing 62 may extend into a fluid in the material handling subsystem 24 if the funnel 64 is omitted. In the configuration shown in FIG. 1, the funnel 64 receives material 30 that has passed between and has been formed by the first roller 50 and the second roller 52.

Figure 2:
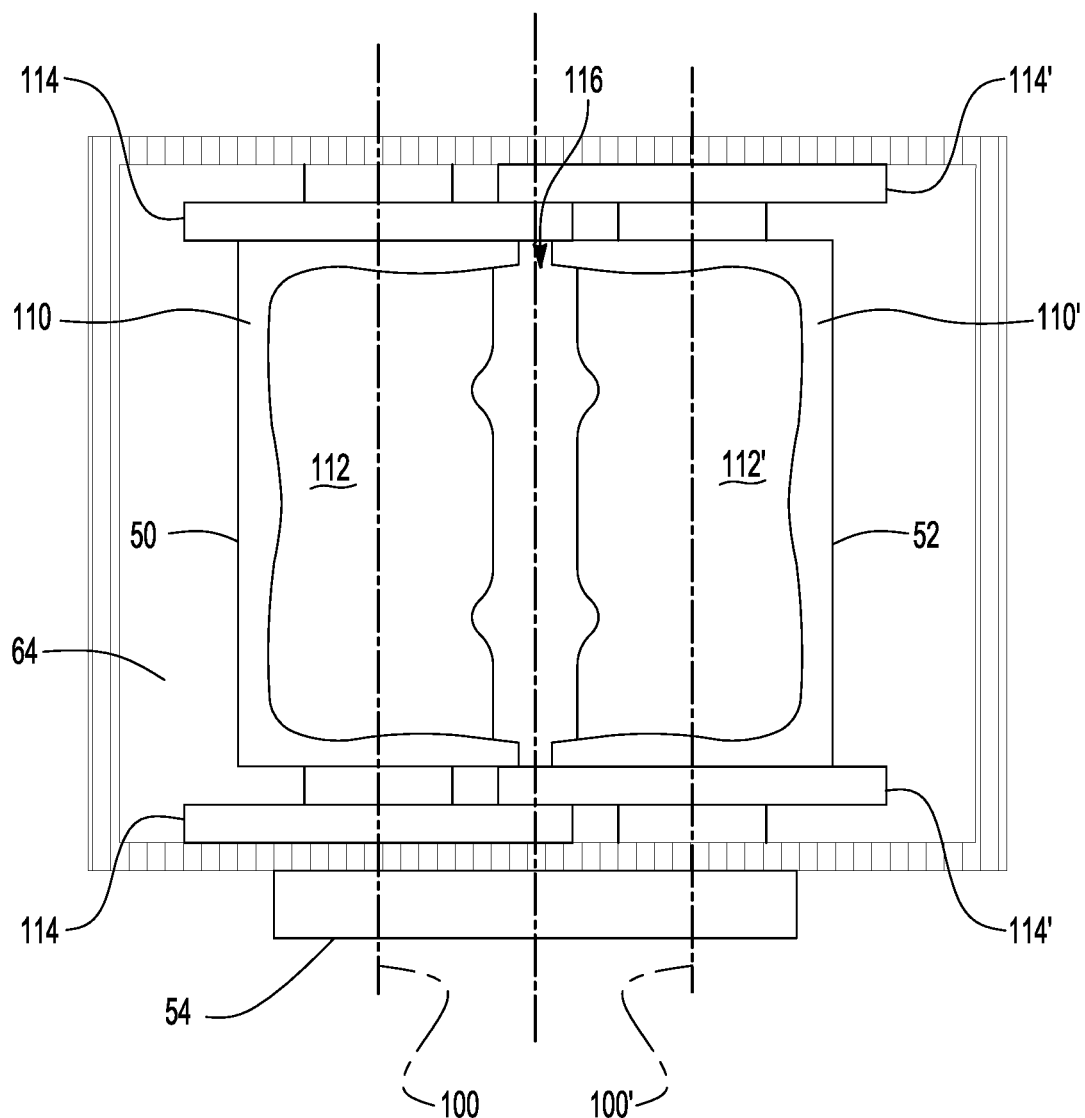
FIG. 2 is a plan view of a portion of FIG. 1 taken below a die plate and above rollers that may be provided with the system.

The first roller 50 may be positioned between the die plate 60 and the funnel 64. For instance, the first roller 50 may be positioned below and may be spaced apart from the die plate 60. At least a portion of the first roller 50 may be disposed above the funnel 64 and may be spaced apart from the funnel 64. As such, the first roller 50 may be at least partially received in the chamber 80. The first roller 50 be rotatable about a first axis 100. In at least one configuration and as is best shown in FIG. 2, the first roller 50 may have a first center portion 110, at least one recess 112, one or more end plates 114, or combinations thereof.

The first center portion 110 may extend around or encircle the first axis 100. In at least one configuration, the first center portion 110 may be disposed at a constant or substantially constant radial distance from the first axis 100. The first center portion 110 may be positioned above the funnel 64.

At least one recess 112 may extend from the first center portion 110 toward the first axis 100. In the configuration shown, a single recess 112 is illustrated; however, it is contemplated that multiple recesses may be provided. Moreover, multiple recesses may be spaced apart from each other.

One or more end plates 114 may be provided with the first roller 50. In the configuration shown, two end plates 114 are shown that are disposed proximate opposite ends of the first center portion 110. An end plate 114 may be rotatable about the first axis 100 with the first center portion 110. In addition, an end plate 114 may extend further from the first axis 100 than the first center portion 110. The end plates 114 may help contain filaments 32 so that filaments 32 do not roll off an end of the first roller 50 and may help direct filaments 32 into a gap 116 that is located between the first roller 50 and the second roller 52. The size and configuration of the gap 116 may vary as the first roller 50 and the second roller 52 rotate.

Referring to FIGS. 1 and 2, the second roller 52 may be generally aligned with the first roller 50. As such, the second roller 52 may be positioned between the die plate 60 and the funnel 64 and may be positioned below and may be spaced apart from the die plate 60. At least a portion of the second roller 52 may be disposed above the funnel 64. As such, the second roller 52 may be at least partially received in the chamber 80. The second roller 52 be rotatable about a second axis 100'. In at least one configuration and as is best shown in FIG. 2, the second roller 52 may have a second center portion 110', at least one recess 112', one or more end plates 114', or combinations thereof.

The second center portion 110' may extend around or encircle the second axis 100'. In at least one configuration, the second center portion 110' may be disposed at a constant or substantially constant radial distance from the second axis 100'. The second center portion 110' may be positioned above the funnel 64.

At least one recess 112' may extend from the second center portion 110' toward the second axis 100'. In the configuration shown, a single recess 112' as illustrated; however, it is contemplated that multiple recesses may be provided and that the recesses may be spaced apart from each other. In at least one configuration, a recess 112' that is provided with the second roller 52 may not have mirror symmetry with a corresponding recess that is provided with the first roller 50, thereby allowing a mesh cushion to be formed with opposing sides that have different configurations.

One or more end plates 114' may be provided with the second roller 52. In the configuration shown, two end plates 114' are shown that are disposed proximate opposite ends of the second center portion 110'. An end plate 114' may be rotatable about the second axis 100' with the second center portion 110'. In addition, an end plate 114' may extend further from the second axis 100' than the second center portion 110'. The end plates 114' may help contain filaments 32 so that filaments 32 do not roll off an end of the second roller 52 and may help direct filaments 32 into the gap 116.

An end plate 114 that is provided with the first roller 50 may engage and may overlap an adjacent end plate 114' that is provided with the second roller 52 to help direct filaments 32 into the gap 116. In addition, an end plate may overlap a roller to which the end plate is not attached. For instance, an end plate 114 that is provided with the first roller 50 may overlap the second roller 52 to help direct filaments into the gap 116. In addition or alternatively, an end plate 114 that is provided with the first roller 50 may have an outside circumference or outer surface that faces away from the first axis 100 that is disposed closer to the second axis 100' than the second center portion 110' is disposed to the second axis 100'. An end plate 114' that is provided the second roller 52 may have an outside circumference or outer surface that faces away from the second axis 100' that is disposed closer to the first axis 100 than the first center portion 110 is disposed to the first axis 100. An end plate 114, 114' may be received inside the funnel 64 or may be disposed outside the funnel 64. The outside circumference or outer surface of an end plate 114, 114' may or may not be positioned above the funnel 64.

The roller drive unit 54 may be configured to rotate the first roller 50 and the second roller 52. For instance, the roller drive unit 54 may rotate the first roller 50 and the second roller 52 in opposite directions about their respective axes. In FIG. 1, the first roller 50 may be rotated in a clockwise direction about the first axis 100 from the perspective shown while the second roller 52 may be rotated in a counterclockwise direction about the second axis 100' from the perspective shown as is represented by the curved arrow lines. In addition, the roller drive unit 54 may synchronize rotation of the first roller 50 and the second roller 52 so that the recess 112 of the first roller 50 is aligned with the recess 112' of the second roller 52 during each roller revolution, thereby allowing opposite sides of the mesh cushion 12 to be formed with a desired cross section at each point along its length. Improper roller synchronization may result in recess misalignment and an improperly formed mesh cushion 12.

It is noted that the first roller 50, the second roller 52, and the roller drive unit 54 may be omitted in various extruder subassembly configurations, such as the configurations shown in FIGS. 3 and 4.

Filaments 32 may be deposited on the first roller 50 and the second roller 52 while the first roller 50 and the second roller 52 are rotating. Rotation of the first roller 50 and the second roller 52 may direct the filaments 32 toward and through the gap 116, thereby consolidating the filaments 32 and placing each filament 32 into contact with one or more other filaments 32. Filaments 32 may bend or twist in irregular ways and in a generally nonpatterned or nonrepeating manner. The recesses 112, 112' may further form filaments 32 so that the filaments 32 that contact the surface of each roller that defines a corresponding recess 112, 112' become a contoured exterior surface of the part. Thus, since the cross sectional area of each roller varies due to the presence and configuration of a corresponding recess 112, 112', the first and second rollers 50, 52 may form filaments 32 into a mesh cushion 12 having a variable cross sectional shape.

Referring to FIG. 1, the environmental control subsystem 22 may control one or more attributes or characteristics of the air inside the chamber 80. For instance, the environmental control subsystem 22 may control the temperature of air in the chamber 80, the humidity of air in the chamber 80, the flow of air in the chamber 80, recirculation of air in the chamber 80, exhausting air from the chamber 80, or combinations thereof, to help control the thickness of the filaments 32. In at least one configuration, the environmental control subsystem 22 may include a fan 120 and one or more temperature modifying devices.

In FIGS. 1, 3, and 4, two temperature modifying devices 122, 124 are shown; however, it is contemplated that a different number of temperature modifying devices may be provided. A temperature modifying device may have any suitable configuration. For instance, a temperature modifying device may be configured as a heat exchanger, heating element, cooling element, or the like. As one example, a first temperature modifying device 122 may be configured to heat air while a second temperature modifying device 124 may be configured to cool and/or dehumidify air that is circulated by the fan 120 from the chamber 80, through the environmental control subsystem 22, and back to the chamber 80.

The environmental control subsystem 22 may be used to maintain the temperature of the air in the chamber 80 within a predetermined temperature range. The predetermined temperature range may be slightly less than the melting temperature of the material 30. As an example, the predetermined temperature range may be no more than 10° F. less than the melting temperature of the material 30. Similarly, the environmental control subsystem 22 may be used to maintain the humidity of the air in the chamber 80 within a predetermined humidity range.

Components of the environmental control subsystem 22, such as the fan 120, and the temperature modifying devices 122, 124 may be mounted to the housing 62 or may be remotely positioned from the extruder subsystem 20 and fluidly connected to the chamber 80 by any suitable conduit, such as a hose or duct.

The material handling subsystem 24 may receive the material 30 after the material 30 exits the extruder subsystem 20. The material handling subsystem 24 may be provided in various configurations. In the configuration shown in FIG. 1, the material handling subsystem 24 includes a tank 130 and a conveyor 132.

The tank 130 may receive the material 30 exiting the extruder subsystem 20. In addition, the tank 130 may receive a fluid 134, such as water. The fluid 134 may be provided in a liquid state and may be provided at a temperature that is significantly less than the melting temperature of the material 30. As such, the fluid 134 may cool and harden the filaments 32 into the mesh cushion 12. Thus, the fluid 134 may cool the filaments 32 so that the filaments 32 are no longer in a sticky molten state.

The conveyor 132 may transport the mesh cushion 12. In the least one configuration, the conveyor 132 or a portion thereof may be received in the tank 130 and may be at least partially submerged in the fluid 134. The length of the conveyor 132 that is disposed in the fluid 132 may be sufficient to provide adequate cooling and hardening of the filaments 32 for subsequent material handling operations.

In the configuration shown in FIG. 1, a portion of the conveyor 132 is shown that is located below the extruder subsystem 20 and that is submerged in the fluid 134. The conveyor 132 may be spaced apart from the extruder subsystem 20 and the funnel 64 so that there is sufficient space for the filaments 32 to exit the funnel 64. The conveyor 132 may be disposed closer to the surface of the fluid 134 than is shown. Moreover, it is contemplated that a portion of the conveyor 132 may exit the fluid 134 to facilitate removal of the mesh cushion 12 from the tank 130.

In the configuration shown in FIG. 3, the material handling subsystem 24 may also include at least one mold 140. The mold 140 may be positionable on the belt of the conveyor 132 and the conveyor 132 may be configured to move the mold 140 with respect to the extruder subsystem 20. The mold 140 may define a mold cavity 142 into which the filaments 32 may be deposited or dispensed. The mold cavity 142 may be open in a direction that faces upward or toward the extruder subsystem 20.

The mold 140 may or may not be positioned in the tank 130 when filaments 32 are deposited into the mold cavity 142. In FIGS. 3 and 4, an example is shown in which the mold 140 is partially received in the fluid 134 when the filaments 32 are deposited into the mold cavity 142. In a configuration in which the extruder subsystem 20 is stationary, the conveyor 132 may advance the mold 140 underneath the funnel 64 and with respect to the funnel 64, thereby allowing the mold cavity 142 to be filled with filaments 32. The mold 140 may then be lowered into the fluid 134.

The mold 140 may be lowered into or at least partially submerged into the fluid 134 in various ways. In the configuration shown, the conveyor 132 is configured to lower the mold 140 into the fluid 134. The conveyor 132 is inclined downward into the tank 130 so that the mold 140 is lowered into the fluid 134 as the mold 140 moves away from the funnel 64, thereby allowing the fluid 134 to circulate through the filaments 32 and the mold cavity 142 to cool and harden the filaments 32. As another example, the mold 140 may be lowered into the fluid 134 or lifted out of the fluid 134 without the use of a conveyor 132, such as by moving the mold 140 in a generally vertical direction or in a rotating loop that may move into and out of the fluid 134. It is also contemplated that the conveyor 132 may be omitted and that the mold 140 may be moved manually or in another manner, such as during small batch manufacturing.

In the configuration shown in FIG. 4, material handling subsystem 24 may be similar to or the same as that shown in FIG. 3. However, in FIG. 4 the extruder subsystem 20 is mounted to or couple to a robotic manipulator 150.

The robotic manipulator 150 may be movable along multiple axes and may have multiple degrees of freedom. For instance, the robotic manipulator 150 may be configured to move the extruder subsystem 20 along a first axis 152, a second axis 154, and a third axis 156.

The first axis 152 may be a vertical axis.

The second axis 154 may be a horizontal axis that may be disposed perpendicular to the first axis 152 and that may extend in a left/right direction from the perspective shown.

The third axis 156 may be disposed perpendicular to the first axis 152 and the second axis 154 and may extend in a forward/backward direction from the perspective shown.

The extruder subsystem 20 may deposit filaments 32 into the mold cavity 142 when the mold 140 is stationary or in motion. It is also contemplated that the conveyor 132 may be omitted and that the mold 140 may be moved manually or in another manner, such as during small batch manufacturing. The configuration shown in FIG. 4 and its associated attributes will be discussed in more detail below.

Referring to FIG. 1, the control subsystem 26 may monitor and control operation of the system 10. For instance, the control subsystem 26 may include one or more or control modules or electronic controllers 200 that may monitor and/or control operation of one or more subsystems of the system 10. For instance, a controller 200 may be a microprocessor-based controller that may be electrically connected to or communicate with components of the extruder subsystem 20 such as the feeder 42 and the roller drive unit 54, the environmental control subsystem 22, the material handling subsystem 24, or combinations thereof. The controller 200 may also control operation of the robotic manipulator 150, if provided. For simplicity, a single controller is shown in FIG. 1; however, it is contemplated that multiple control modules or controllers or a distributed control architecture may be provided with the control subsystem 26. The control subsystem 26 is also provided with the configurations shown in FIGS. 3 and 4 but has been omitted from these figures merely for clarity.

The controller 200 may also process input signals or data from various input devices or sensors. Input devices that may be provided with the system 10 may include a temperature sensor 160 and a humidity sensor 162.

The temperature sensor 160 may provide a signal indicative of the temperature of air in the chamber 80. The temperature sensor 160 may be of any suitable type, such as a thermistor, thermocouple, semiconductor-based temperature sensor, infrared sensor, or the like. The temperature sensor 160 may be provided in any suitable location. For instance, the temperature sensor 160 may be provided in the chamber 80 or may be provided in the environmental control subsystem 22.

The humidity sensor 162 may provide a signal indicative of the humidity of air in the chamber 80. The humidity sensor 162 may be of any suitable type, such as a capacitive humidity sensor, resistive humidity sensor, or thermal conductivity humidity sensor. The humidity sensor 162 may be provided in any suitable location. For instance, the humidity sensor 162 may be provided in the chamber 84 or may be provided in the environmental control subsystem 22.

Referring again to FIG. 4, the robotic manipulator 150 may be configured to move the extruder subsystem 20 to vary the filament density of the mesh cushion 12. For example, the material 30 may be extruded through the filament forming openings 70 in one or more die plates 60 at a substantially constant flow rate. Thus, the filaments 32 may be expected to have substantially the same diameter or thickness given a constant filament forming opening size. However, the filaments 32 become thinner as the distance from the die plate 60 and the filament forming openings 70 increases. This is best understood with reference to FIGS. 5A and 5B.

In FIG. 5A, a magnified view of a portion of a die plate 60 and a filament forming opening 70 is shown. The die plate 60 is positioned at a first distance Z1 above a surface S.

In FIG. 5B, the die plate 60 is positioned at a second distance Z2 above the surface S, with Z1 being less than Z2. The filament 32 is thinner or has a smaller diameter at the surface S in FIG. 5B due to the thinning that occurs when the filament 32 extends over an increased distance and the material 30 is in a molten, non-hardened state. These characteristics may be used to vary the filament density of the mesh cushion 12. For instance, the robotic manipulator 150 may move the die plate 60 upward or away from the mold 140 to decrease the size, thickness, or diameter of the filaments 32 when deposited in the mold 140. Conversely, the robotic manipulator 150 may move the die plate 60 toward the mold 140 to increase the size, thickness, or diameter of the filaments 32 when deposited in the mold 140.

The robotic manipulator 150 may also move the die plate 60 when depositing filaments 32 to vary the filament density in other ways. For instance, the robotic manipulator 150 may repeatedly move the die plate 60 toward the mold 140 and then away from the mold 140 and/or decrease its rate of travel and/or increase its stationary dwell time to increase the filament density. As another example, the robotic manipulator 150 may move the die plate 60 in a horizontal plane (i.e., along the second axis 154 and/or the third axis 156) at a faster speed or spend less time in a particular area to decrease the filament density. Conversely, the robotic manipulator 150 may move the die plate 60 and the horizontal plane at a slower speed or spend more time in a particular area to increase the filament density. Accordingly, filament density may increase as the time spent at a particular area increases, which allows more filaments to be deposited, and filament density may decrease as the time spent in a particular area decreases.

It is also noted that in FIG. 4, the environmental control subsystem 22 and various components of the extruder subsystem 20 may be omitted, such as the portion of the housing 62 located below the die plate 60, the funnel 64, or both.

Referring to FIGS. 6A through 8B, examples of extruder subsystem configurations having interchangeable die plates or multiple die plates will now be discussed. Multiple die plates may be provided with any of the extruder subsystem configurations previously discussed, such as the configurations shown in FIGS. 1, 3, and 4.

FIGS. 6A and 6B show examples of two different die plates. The die plates 60, 60' have the same size and shape but do not have the same number of filament forming openings 70. The die plate 60 in FIG. 6A has a greater number of filament forming openings 70 than the die plate 60' in FIG. 6B. Thus, the number of filaments 32 that may be provided with the die plate 60 in FIG. 6A is greater than the number of filaments 32 that may be provided with the die plate 60' in FIG. 6B. Accordingly, a mesh cushion 12 may be provided with a lower filament density using the die plate 60' in FIG. 6B as compared to the die plate 60 in FIG. 6A given a constant material flow rate and dispensing time.

Figure 7:
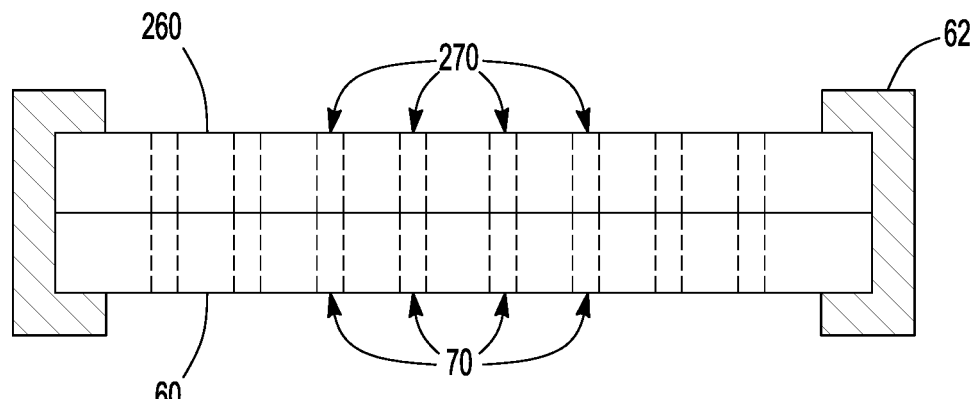
FIG. 7 is a side view illustrating stacked die plates.

Referring to FIG. 7, a configuration having two stacked die plates is shown. At the outset, it is noted that it is contemplated that more than two die plates may be provided in a stacked arrangement.

The configuration in FIG. 7 will primarily be discussed in the context of a first die plate and a second die plate that are stacked directly on top of each other. For clarity, the lower die plate will be referred to as the first die plate while the die plate that rests on top of the first die plate will be referred to as the second die plate; however, it is contemplated that the positioning of the first die plate and the second die plate may be changed or reversed and that additional die plates may be provided.

As an example, the first die plate 60 may be configured as shown in FIG. 6A. The first die plate 60 may have a first set of filament forming openings 70. In at least one configuration, members of the first set of filament forming openings 70 may be provided with the same configuration.

Figure 8A:
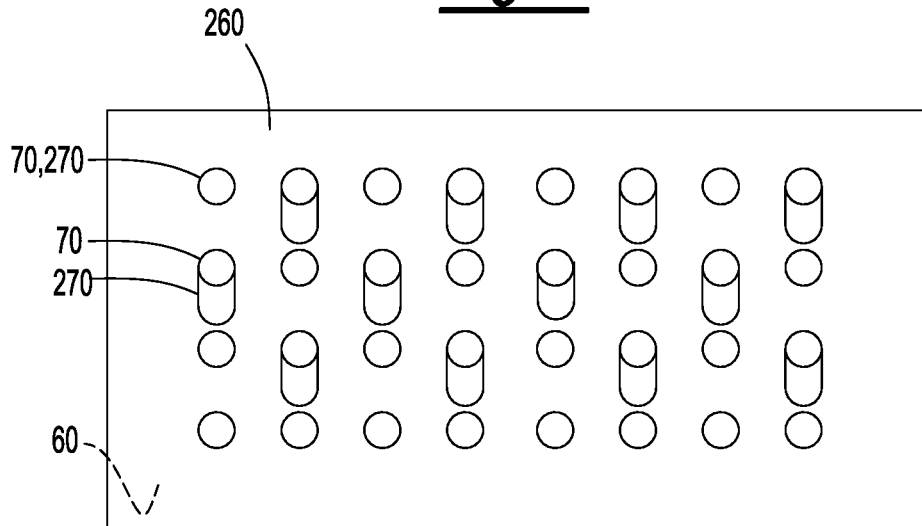
FIGS. 8A and 8B are plan views of the stacked die plates in first and second positions, respectively.

Referring to FIGS. 7 and 8A, example of a second die plate 260 is shown. The second die plate 260 may be disposed adjacent to the first die plate 60 and may have a second set of filament forming openings 270. Members of the second set of filament forming openings 270 may or may not have the same configuration. For example, in FIG. 8A the members of the second set of filament forming openings 270 do not all have the same configuration. Instead, some filament forming openings 270 have the same configuration as the filament forming openings 70 of the first die plate 60 (represented as circles in FIG. 8A) and some filament forming openings 270 are larger than the filament forming openings 70 in the first die plate 60 (represented as elongated oval slots and FIG. 8A). It is also contemplated that the second set of filament forming openings 270 may have fewer members than the first set of filament forming openings 70.

The relative positioning of the second die plate 260 with respect to the first die plate 60 may be adjustable to change the alignment of the filament forming openings 70, 270 with respect to each other. Alignment changes may be accomplished by moving the first die plate 60 or a portion thereof with respect to the second die plate 260, by moving the second die plate 260 or a portion thereof with respect to the first die plate 60, or both. As an example, the first die plate 60 may be held in a stationary position and the second die plate 260 may be slid or moved along the first die plate 60 such the second die plate 260 blocks at least some of the filament forming openings 70 and the first die plate 60. This is best understood by comparing FIGS. 8A and 8B.

In FIG. 8A, the second die plate 260 is shown in an example of a first position. In this example, the second die plate 260 does not block any of the filament forming opening 70 in the first die plate 60 when in the first position. As such, the material 30 may be extruded through the second set of filament forming openings 270 and then through a corresponding member of the first set of filament forming openings 70 that is aligned with a member of the second set of filament forming openings 270 to form a filament 32.

Figure 8B:
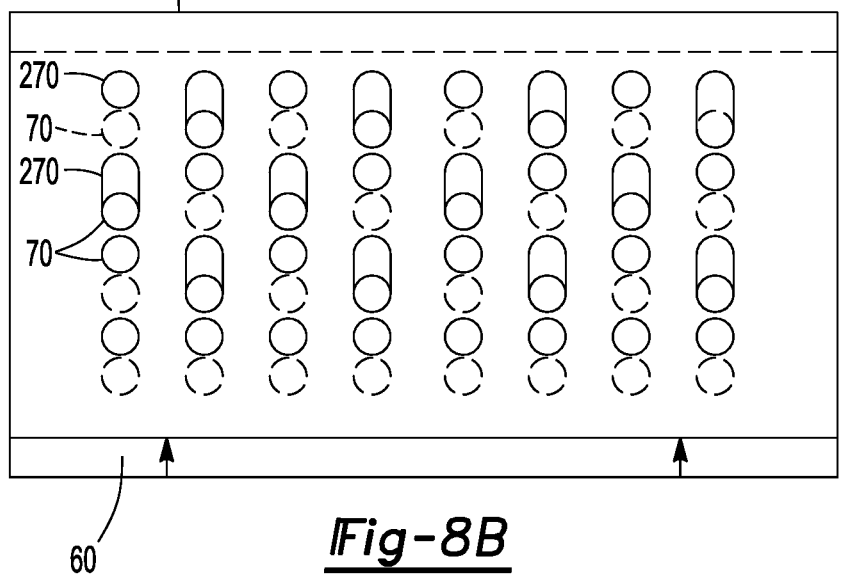

In FIG. 8B, the relative positioning of the first and second die plates 60, 260 is changed as compared to FIG. 8A. In the example in FIG. 8B, the first die plate 60 remains in the same position as in FIG. 8A and the second die plate 260 has been moved to a second position that differs from the first position. As a result, some of the members of the second set of filament forming openings 270 remain aligned with corresponding members of the first set of filament forming openings 70 while other members of the second set of filament forming openings 270 are no longer aligned with members of the first set of filament forming openings 70. As such, the second die plate 260 is positioned to prevent material from reaching and passing through a member of the first set of filament forming openings 70.

More specifically in the example shown, members of the second set of filament forming openings 270 having a circular shape are no longer aligned with any member of the first set of filament forming openings 70 while the elongated oval-shaped members of the second set of filament forming openings 270 have been repositioned but are still sufficiently aligned with a corresponding member of the first set of filament forming openings 70 to permit material 30 to be extruded through the aligned filament forming openings 70. Thus, the larger members (i.e., oval shaped members) of the second set of filament forming openings 270 may permit material 30 to flow through a corresponding member of the first set of filament forming openings 70 when the second die plate 260 is in the first position and in the second position. As a result, filaments 32 are extruded when the second die plate 260 is in the first position and in the second position but the number of filaments 32 that are formed by the die set is reduced when the second die plate 260 is in the second position.

It is contemplated that a die plate may move in a different manner than previously described. As one example, a die plate may be split into multiple pieces that may be independently movable. For instance, the second die plate 260 may be split in half and each half of the second die plate 260 may be movable to selectively block or permit the flow of material 30 through a subset of the first set of filament forming openings 70.

As another example, a die plate may be rotatable about an axis rather than movable in a linear direction.

As another example, multiple die plate regions may be integrated into a single plate that may be rotatable about an axis. Each die plate region may have a different pattern of filament forming openings. The single plate may then be rotated about the axis to align a specific die plate region with another die plate. As a result, each die plate region may provide a different number of filaments when positioned adjacent to or aligned with the other die plate.

It is also contemplated that the second die plate 260 may be movable to a position in which the second die plate 260 blocks all of the members of the first set of filament forming openings 70 of the first die plate 60, thereby terminating the flow of material through the die plates and terminating the extrusion of filaments 32.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a mesh cushion, comprising:
    extruding a material through a plurality of filament forming openings in a die plate to form a plurality of filaments;
    depositing the plurality of filaments on a first roller and a second roller, wherein the first roller is rotatable about a first axis and defines a first recess and a first end plate, and the second roller is rotatable about a second axis and defines a second recess; and
    directing the plurality of filaments into the first recess, the second recess and through a gap between the first roller and the second roller based on a rotation of the first roller and the second roller, and the first end plate overlapping at least a portion of the second roller, thereby forming the plurality of filaments into the mesh cushion having a variable cross-sectional shape.

2. The method of claim 1, wherein the plurality of filaments is deposited on the first roller and the second roller while the first roller and the second roller are rotating.

3. The method of claim 1, wherein the first recess and the second recess do not have mirror symmetry.

4. The method of claim 1, wherein the first roller includes a first center portion from which the first recess extends and the first end plate that is rotatable about the first axis with the first center portion, and wherein the first end plate extends further than the first center portion.

5. The method of claim 4, wherein the second roller includes a second center portion from which the second recess extends and a second end plate that is rotatable about the second axis with the second center portion, wherein the second end plate extends further than the second center portion, and wherein the second end plate overlaps at least a portion of the first roller to direct the plurality of filaments into the second recess and the gap between the first roller and the second roller.

6. The method of claim 5, wherein the first end plate of the first roller and the second end plate of the second roller overlap each other to direct the plurality of filaments into the first recess, the second recess and the gap between the first roller and the second roller.

7. The method of claim 5, wherein the second center portion is disposed at a constant radial distance from the second axis.

8. The method of claim 5, wherein the first end plate has an outer surface that faces away from the first axis, and wherein the outer surface is disposed closer to the second axis than the second center portion is disposed to the second axis.

9. The method of claim 4, wherein the first center portion is disposed at a constant radial distance from the first axis.

10. The method of claim 4, wherein the second end plate has an outer surface that faces away from the second axis, and wherein the outer surface is disposed closer to the first axis than the first center portion is disposed to the first axis.

11. The method of claim 1, wherein at least a portion of the first roller and the second roller are positioned above a funnel that defines a funnel opening through which the material passes.

12. The method of claim 11, wherein the plurality of filaments that are extruded through the die plate are provided to a chamber that is partially defined by a housing that extends between the die plate and the funnel.

13. The method of claim 12, wherein the first roller and the second roller are at least partially received in the chamber.

14. The method of claim 12, wherein an environmental control subsystem comprises a temperature sensor to control temperature of air in the chamber and a humidity sensor to control humidity of the air in the chamber to control thickness of the plurality of filaments.

15. The method of claim 1, wherein the first roller and the second roller form the plurality of filaments into the mesh cushion comprising the variable cross sectional shape based on a presence of the first recess and the second recess on a cross sectional area of the first roller and the second roller.

16. The method of claim 1, wherein the first recess is aligned with the second recess while the first roller and the second roller are rotating.

17. A method, comprising:
depositing a plurality of filaments on a first roller and a second roller, wherein the first roller is rotatable about a first axis and defines a first recess and a first end plate, and the second roller is rotatable about a second axis and defines a second recess; and
directing the plurality of filaments into the first recess, the second recess and through a gap between the first roller and the second roller based on a rotation of the first roller and the second roller, and the first end plate overlapping at least a portion of the second roller, thereby forming the plurality of filaments into a mesh cushion having a variable cross-sectional shape.

18. The method of claim 17, wherein the first roller includes a first center portion from which the first recess extends and the first end plate that is rotatable about the first axis with the first center portion, wherein the first end plate extends further than the first center portion.

19. The method of claim 18, wherein the second roller includes a second center portion from which the second recess extends and a second end plate that is rotatable about the second axis with the second center portion, wherein the second end plate extends further than the second center portion, and wherein the second end plate overlaps at least a portion of the first roller to direct filaments into the second recess and the gap between the first roller and the second roller.

20. The method of claim 19, wherein the first end plate of the first roller and the second end plate of the second roller overlap each other to direct the plurality of filaments into the first recess and the second recess and the gap between the first roller and the second roller.

* * * * *